(12) United States Patent
Ikushima

(10) Patent No.: US 10,015,387 B2
(45) Date of Patent: Jul. 3, 2018

(54) FOCUS ADJUSTMENT METHOD AND DEVICE THEREFOR

(71) Applicant: MUSASHI ENGINEERING, INC., Mitaka-shi, Tokyo (JP)

(72) Inventor: Kazumasa Ikushima, Mitaka (JP)

(73) Assignee: MUSAHI ENGINERRING, INC., Tokyo (JP)

( * ) Notice: Subject to any disclaimer, the term of this patent is extended or adjusted under 35 U.S.C. 154(b) by 177 days.

(21) Appl. No.: 14/904,985

(22) PCT Filed: Aug. 4, 2014

(86) PCT No.: PCT/JP2014/070432
§ 371 (c)(1),
(2) Date: Jan. 14, 2016

(87) PCT Pub. No.: WO2015/019978
PCT Pub. Date: Feb. 12, 2015

(65) Prior Publication Data
US 2016/0165123 A1 Jun. 9, 2016

(30) Foreign Application Priority Data

Aug. 9, 2013 (JP) ................................ 2013-167151

(51) Int. Cl.
*H04N 5/00* (2011.01)
*H04N 5/232* (2006.01)
(Continued)

(52) U.S. Cl.
CPC ....... *H04N 5/23212* (2013.01); *G01B 11/272* (2013.01); *G02B 7/38* (2013.01);
(Continued)

(58) Field of Classification Search
CPC .......... H04R 25/00; H04R 3/00; H04R 19/00; H04R 19/02; H04R 1/26
See application file for complete search history.

(56) References Cited

U.S. PATENT DOCUMENTS 5,960,125 A * 9/1999 Michael .................... G06T 7/80
382/151
5,978,080 A * 11/1999 Michael ............... G01B 11/002
356/243.1
(Continued)

FOREIGN PATENT DOCUMENTS

JP 62-180252 A 8/1987
JP 6-143438 A 5/1994
(Continued)

OTHER PUBLICATIONS

International Search Report dated Nov. 4, 2014, issued in counterpart International Application No. PCT/JP2014/070432. (2 pages).
(Continued)

*Primary Examiner* — Frank Huang
(74) *Attorney, Agent, or Firm* — Westerman, Hattori, Daniels & Adrian, LLP

(57) ABSTRACT

A focus adjustment method and a device for the same are capable of realizing automatic focusing on a feature point of an arbitrary object selected from an image in which objects having various shapes are captured. The focus adjustment method includes a first step of obtaining a partial captured image in which a portion of the substrate is captured by the image capture device, and displaying the partial captured image in the image display region having a plurality of divided regions, a second step of causing the in-focus determination device to perform in-focus image determination for one divided region that is selected by a user through the input device, and a third step of displaying the captured (Continued)

image, which has been determined as the in-focus image, in the image display region.

10 Claims, 7 Drawing Sheets

(51) Int. Cl.

| | | |
|---|---|---|
| G02B 7/38 | (2006.01) | |
| G01B 11/27 | (2006.01) | |
| G06F 3/041 | (2006.01) | |
| G06K 9/46 | (2006.01) | |
| G06T 7/00 | (2017.01) | |
| G06T 7/20 | (2017.01) | |

(52) U.S. Cl.
CPC ............... *G06F 3/041* (2013.01); *G06K 9/46* (2013.01); *G06T 7/001* (2013.01); *G06T 7/20* (2013.01); *H04N 5/23293* (2013.01); *G06K 2009/4666* (2013.01); *G06T 2207/30148* (2013.01)

(56) References Cited

U.S. PATENT DOCUMENTS

| 6,362,877 | B1* | 3/2002 | Kobayashi | G01R 31/281 |
|---|---|---|---|---|
| | | | | 257/E21.53 |
| 2007/0187571 | A1* | 8/2007 | Ebe | G02B 7/36 |
| | | | | 250/201.2 |
| 2007/0189559 | A1* | 8/2007 | Haan | H04R 19/00 |
| | | | | 381/191 |
| 2010/0235736 | A1* | 9/2010 | Fleisher | G06F 3/0481 |
| | | | | 715/702 |
| 2011/0133054 | A1 | 6/2011 | Campbell | |
| 2012/0300056 | A1 | 11/2012 | Ban et al. | |
| 2014/0355193 | A1* | 12/2014 | Purcocks | G06F 1/1662 |
| | | | | 361/679.17 |

FOREIGN PATENT DOCUMENTS

| JP | 6-174446 A | 6/1994 |
|---|---|---|
| JP | 11-325851 A | 11/1999 |
| JP | 2005-99736 A | 4/2005 |
| JP | 2010-109146 A | 5/2010 |
| WO | 94/24518 A1 | 10/1994 |
| WO | 2011/092771 A1 | 8/2011 |

OTHER PUBLICATIONS

International Preliminary Report on Patentability issued in International Application No. PCT/JP2014/070432. (10 pages).
Mitutoyo: "CNC Vision Measuring System Quick Vision Vision Measuring Systems", Jul. 2, 2009, retrieved from the Internet: URL:https://www.mitutoyo.co.jp/eng/products/gazoukogaku/pdf/E4317.pdf. pp. 1-6, pp. 13-22; cited in Supplemental European Search Report.
Supplementary European Search Report dated Jan. 31, 2017, issued in counterpart European Application No. 14833673.8. (2 pages).

\* cited by examiner

[Fig. 1]
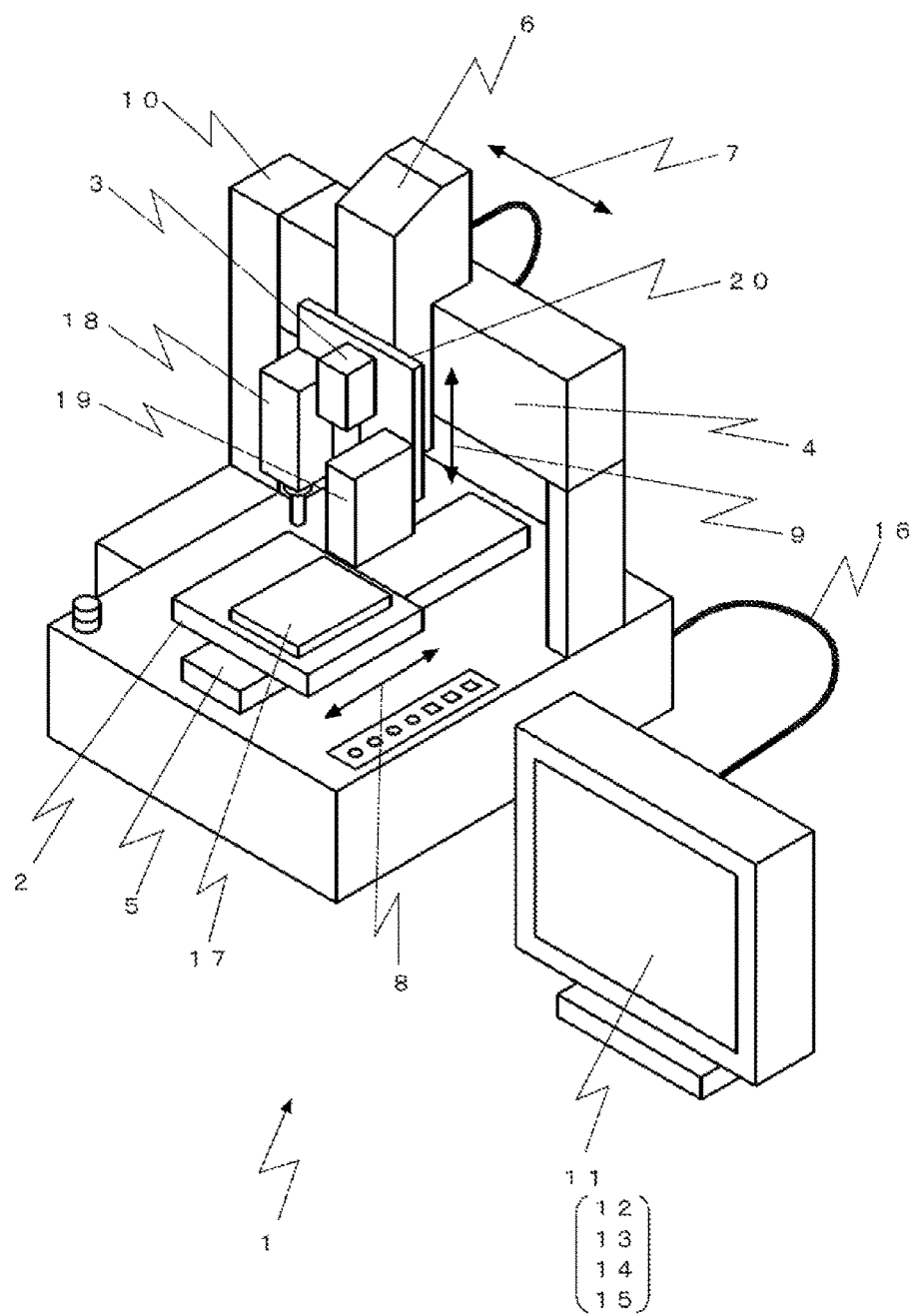

[Fig. 2]
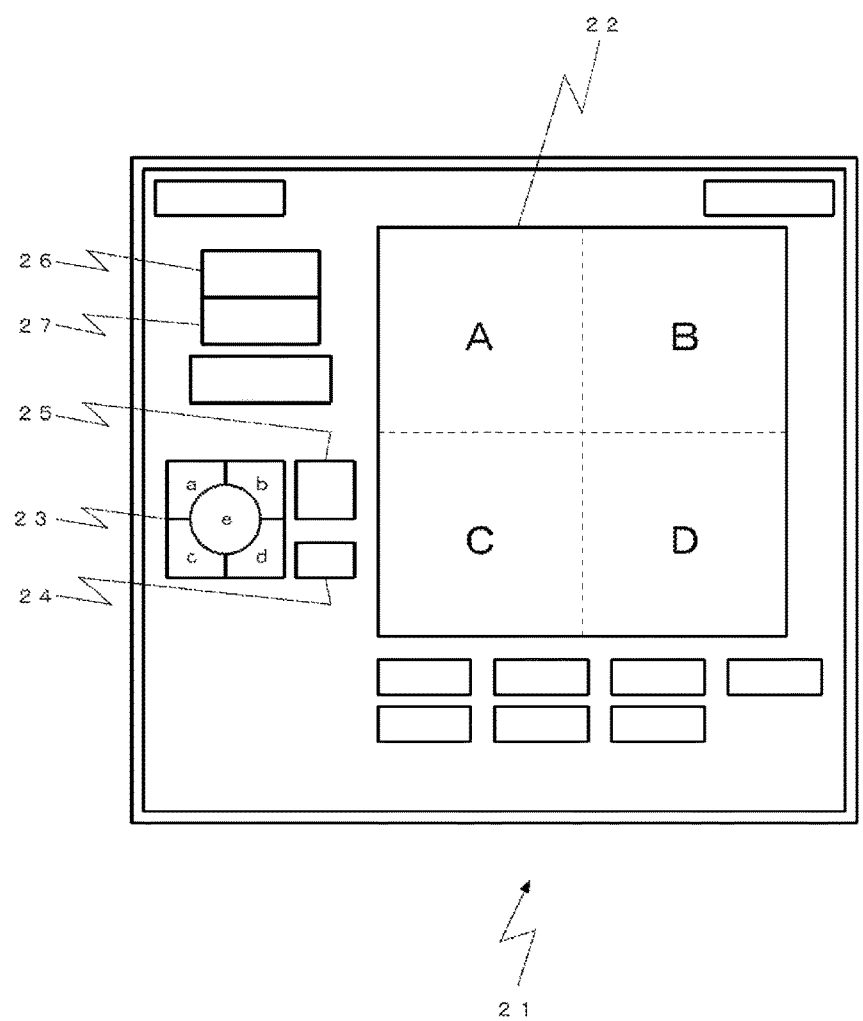

[Fig. 3]
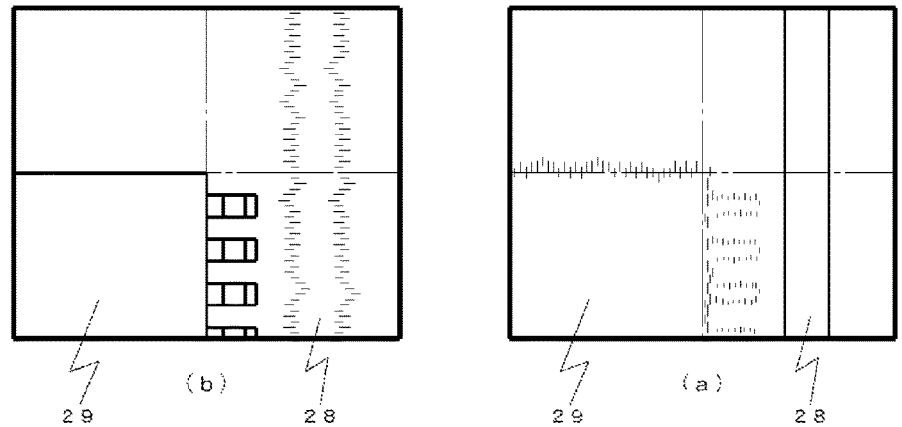
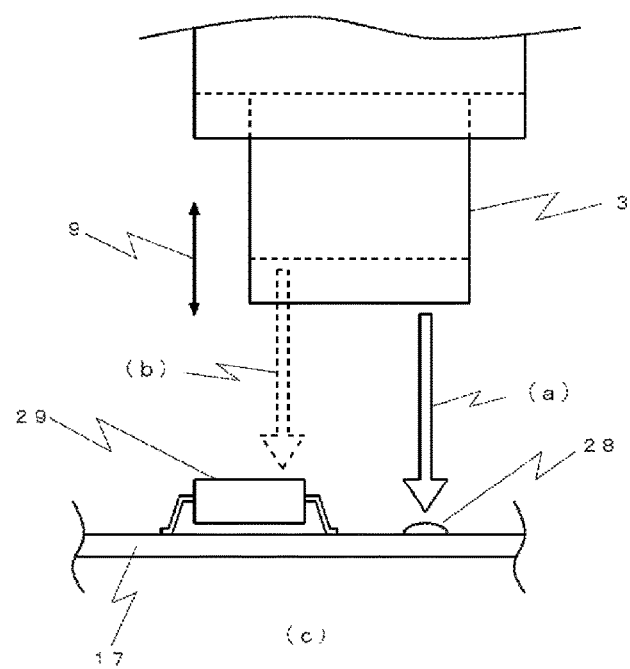

[Fig. 4]
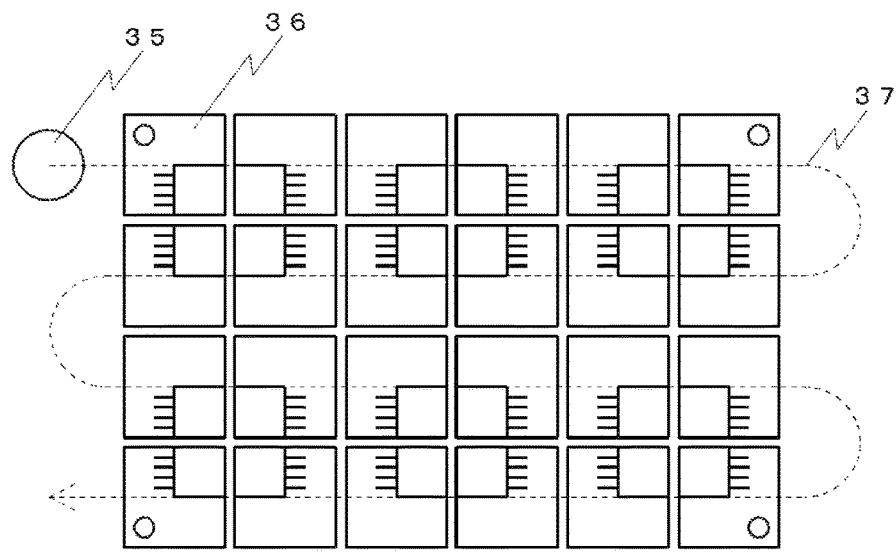
(a)
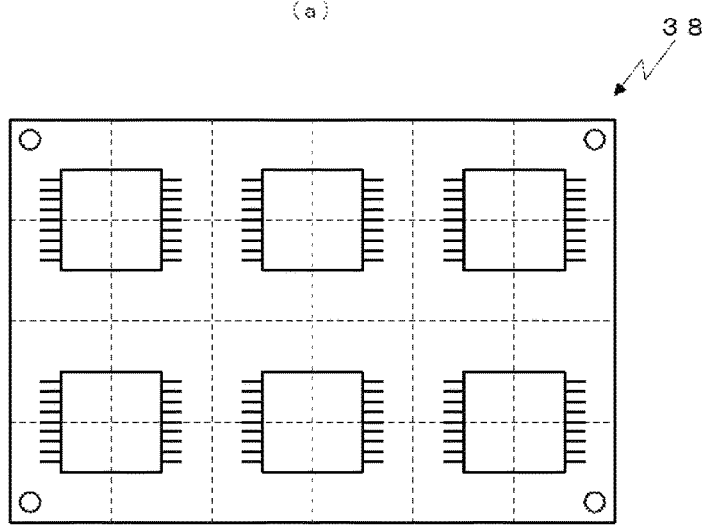
(b)

[Fig. 5]
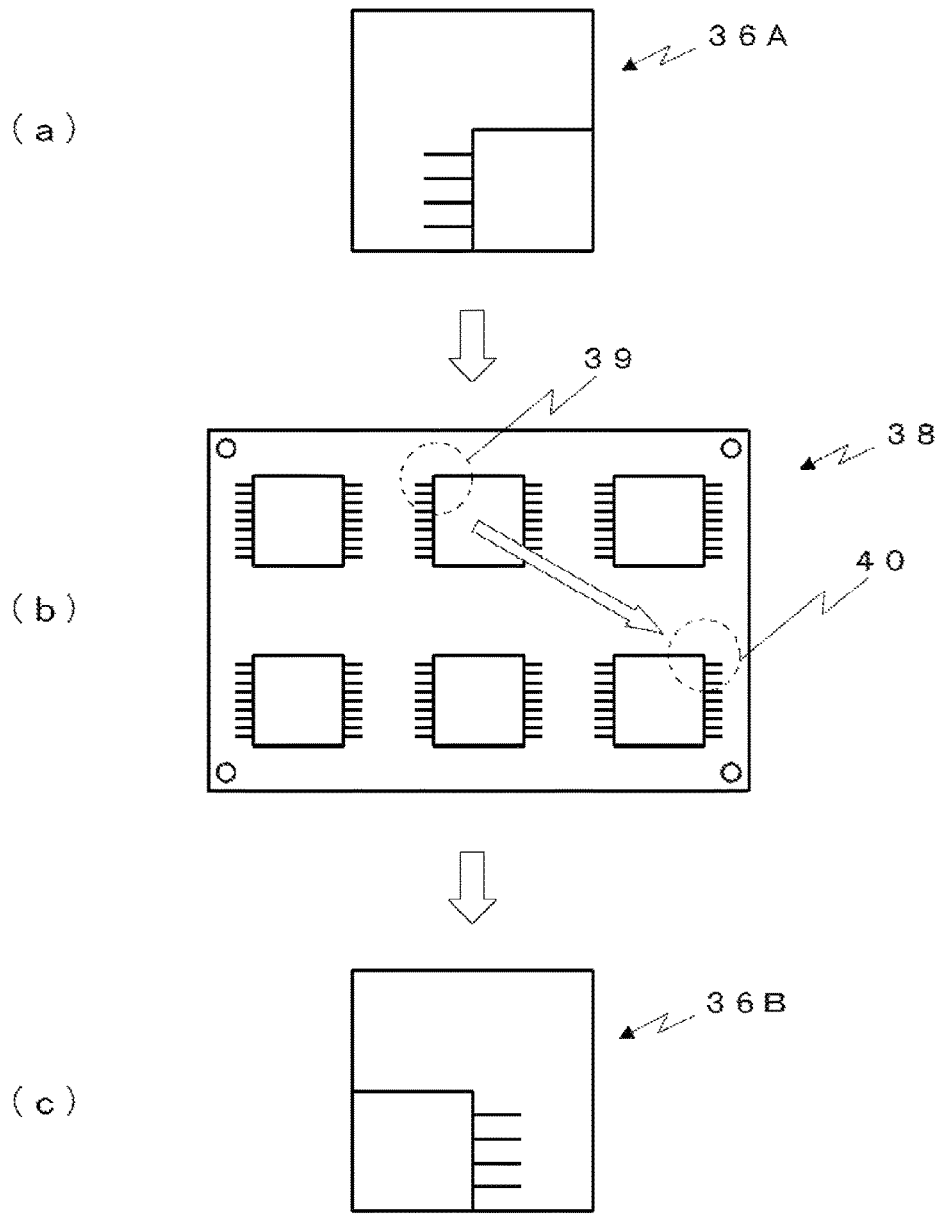

[Fig. 6]
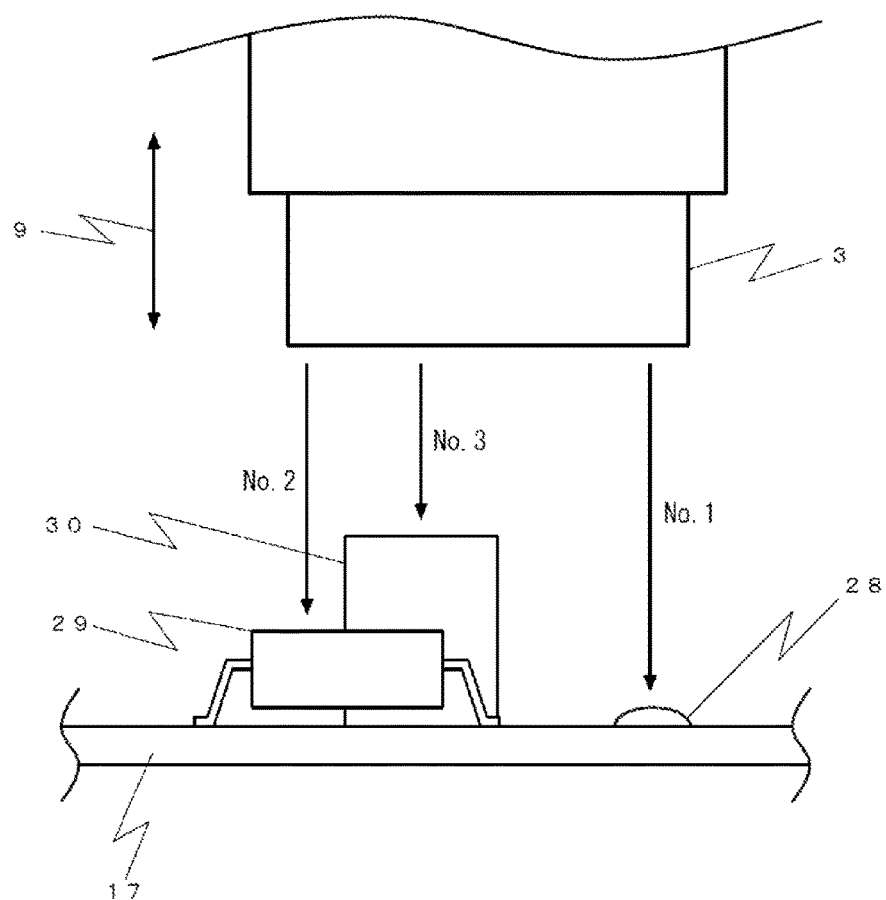

[Fig. 7]
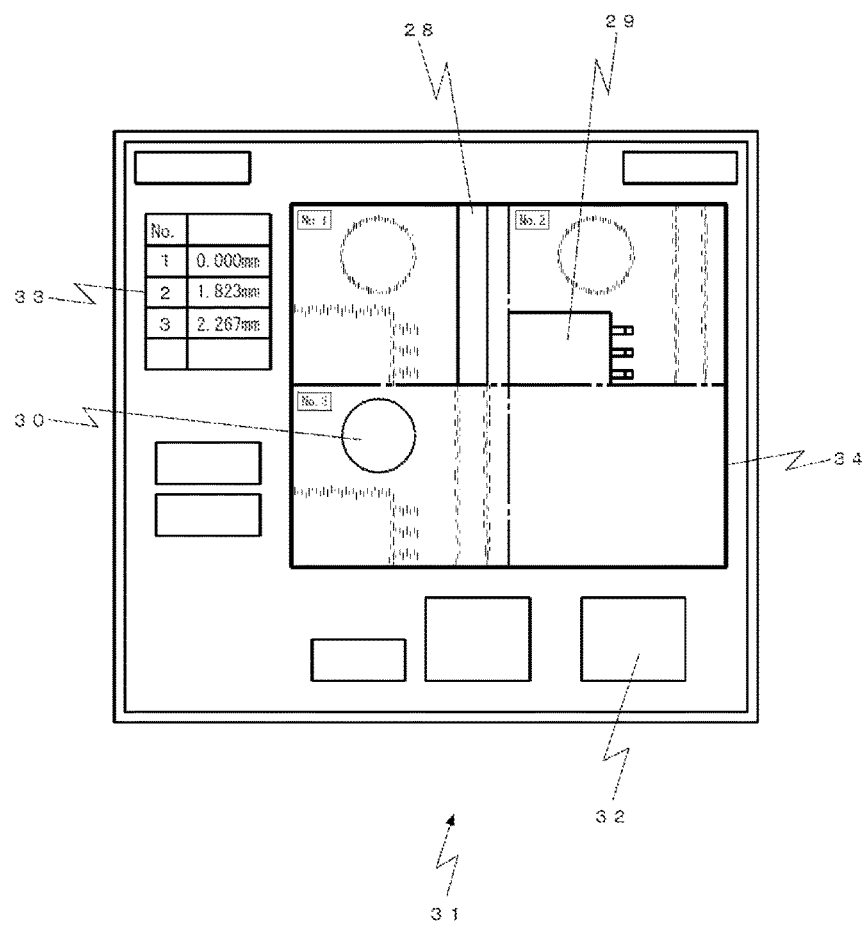

FOCUS ADJUSTMENT METHOD AND DEVICE THEREFOR

TECHNICAL FIELD

The present invention relates to a focus adjustment method and a device for the same. More particularly, the present invention relates to a focus adjustment method and a device for the same, which are used in teaching of a reference position to correct a position deviation or an inclination, the teaching being executed, for example, prior to performing work, such as coating or inspection, on a substrate on which electric or electronic parts are mounted.

BACKGROUND ART

When work, such as coating or inspection, is performed on a substrate on which electric or electronic parts are mounted, an operation called "alignment" has to be made before starting a working process. The term "alignment" means an operation of measuring a deviation of the substrate, which is placed on a work table of a working device, from a reference position, and correcting the measured deviation. In order to perform the alignment, it is required to set a feature point serving as a reference, and a position of the feature point. The feature point serving as the reference is usually given as an alignment mark that is formed on a substrate surface. In other cases, a corner of the mounted part or a printed character is also used as the feature point. However, many parts having various shapes different in size and height are mounted on a mounting substrate. Accordingly, when one of the mounted parts is used as an alignment reference, a focus of a camera needs to be adjusted depending on the height of the relevant part.

Adjustment of a focus in a device to perform processing on a mounting substrate is made in many cases by a technique of preparing a mechanism that changes a relative distance between a camera including a single-focus lens and the substrate, and adjusting the focus while gradually changing the relative distance. For example, Patent Document 1 discloses an inspection device comprising image capture means for capturing an image of a mounted state of an electronic part that is mounted on a substrate, drive means for driving the image capture means in a direction toward or away from the electronic part mounted on the substrate, determination means for determining, on the basis of an image signal from the image capture means, whether a focus of the image capture means is aligned with a predetermined position, driving control means for operating the drive means to drive the image capture means in accordance with a determination result of the determination means such that the focus of the image capture means is aligned with the predetermined position, storage means for storing and accumulating a focus position of the image capture means driven by the drive means at a time when the focus of the image capture means is aligned with the predetermined position, and setting means for, when positioning of the focus of the image capture means is repeated, setting a drive range of the image capture means on the basis of the focus positions of the image capture means, which are stored and accumulated in the storage means.

Furthermore, Patent Document 2 discloses a work surface measurement device comprising image capture means for observing a work surface, a stage for changing a relative distance between the image capture means and a work, image capture control means for controlling the image capture means to capture an image plural times during movement of the stage, and control means for discriminating one of the plural images obtained by the image capture control means, the one having a maximum contrast, and determining a work position by employing only the discriminated image.

Several techniques for setting a focus position at the same time as when setting a reference position have been proposed so far. For example, Patent Document 3 discloses a mounted-part inspection device comprising focus adjustment means for adjusting a focus of an image capturing optical system in an image capture device, teaching means for teaching focus information for each of inspection regions of a substrate to be inspected, storage means for storing the focus information, which has been taught from the teaching means, in link with the corresponding inspection region, and control means for, when each inspection region is inspected, operating the focus adjustment means in accordance with the focus information, which is stored in the storage means, such that the focus of the image capturing optical system is automatically adjusted.

Moreover, Patent Document 4 discloses a printed board inspection device comprising a TV camera provided with a zooming mechanism and a focusing mechanism, the TV camera being able to capture images of a printed board at plural magnifications, and means for dividing a surface of the printed board into a plurality of areas for each of the image capture magnifications, and controlling zooming and focusing of the TV camera before capturing images of the areas at each magnification.

CITATION LIST

Patent Documents

Patent Document 1: Japanese Patent Laid-Open Publication No. 2010-109164
Patent Document 2: Japanese Patent Laid-Open Publication No. H11-325851
Patent Document 3: Japanese Patent Laid-Open Publication No. H6-174446
Patent Document 4: Japanese Patent Laid-Open Publication No. S62-180252

SUMMARY OF INVENTION

Technical Problem

However, various objects having various shapes, such as the substrate surface and the parts, are captured within a visual field of a camera (i.e., within an image output with a monitor or the like), and manual judgment by an operator is required to determine a target from those objects, which is to be focused. In other words, it has been difficult to automatically select the object to be focused.

Moreover, additional work, such as special image processing by software or a manual operation of moving the camera to a position where only the target is captured, has been required to perform selective focusing only on the selected target.

It is conceivable to use a lens with an autofocus function (which is similar to a lens equipped in a commercially available still camera) instead of vertically moving the camera. However, the solution using such a lens causes the problems that, because the lens is heavy, the size of a relatively moving device needs to be increased, and that, because the lens is expensive, the device cost is increased.

With the view of solving the above-described problems in the art, an object of the present invention is to provide a focus adjustment method and a device for the same, which are capable of realizing automatic focusing on a feature point of an arbitrary object selected from an image in which objects having various shapes are captured.

Solution to Problems

The present invention provides a focus adjustment method using a working device that includes a work table on which a substrate is placed; an image capture device not having an autofocus function; an XYZ drive device that moves the work table and the image capture device relative to each other; a storage device that stores images captured by the image capture device; a display device that displays an image display region; an input device allowing an arbitrary position in the image display region to be specified; an in-focus determination device that executes image processing on the plurality of captured images having been stored in the storage device, and that determines an in-focus image on the basis of contrasts of the captured images; and a control device that controls operations of the image capture device and the XYZ drive device, wherein the focus adjustment method comprises a first step of obtaining a partial captured image in which a portion of the substrate is captured by the image capture device, and displaying the captured image in the image display region having a plurality of divided regions; a second step of causing the in-focus determination device to perform in-focus image determination for one divided region that is selected by a user through the input device; and a third step of displaying the captured image, which has been determined as the in-focus image, in the image display region.

In the above focus adjustment method according to the present invention, the substrate may be a substrate including a plurality of objects having different heights, which are arranged on a surface of the substrate, and an image of a portion of the substrate may be captured in the first step such that the captured image includes at least one of the objects. As an alternative, in the first step, an image of a portion of the substrate may be captured such that the captured image includes at least two of the objects. Preferably, at least one of the objects is rectangular, and the image display region is divided into four equal divided regions.

In the above focus adjustment method according to the present invention, the second step may be executed in such a way that the captured images are continuously obtained while the image capture device is moved in a Z-direction, the captured images are stored in the storage device together with Z-coordinate values at times when the images are captured, one of the captured images in the one divided region selected by the user, the one having a peak in contrast, is determined as an in-focus image, an in-focus identification flag is assigned to the captured image having been determined as the in-focus image, and movement of and image-capturing by the image capture device is stopped.

In the focus adjustment method according to the present invention, the second step may be executed in such a way that the captured images are continuously obtained while the image capture device is moved in a Z-direction, the captured images are stored in the storage device together with Z-coordinate values at times when the images are captured, ones of the captured images in the one divided region selected by the user, the ones satisfying a determination reference value, are determined as in-focus images, and an in-focus identification flag is assigned to each of the captured images having been determined as the in-focus images, and in the third step, the captured images each assigned with the in-focus identification flag may be all displayed in an arrayed state. Moreover, height information of an in-focus object in each of the in-focus images may be displayed together in the third step.

The present invention further provides a working device comprising a work table on which a substrate is placed; an image capture device not having an autofocus function; an XYZ drive device that moves the work table and the image capture device relative to each other; a storage device that stores images captured by the image capture device; a display device that displays an image display region; an input device allowing an arbitrary position in the image display region to be specified; an in-focus determination device that executes image processing on the plurality of captured images having been stored in the storage device, and that determines an in-focus image on the basis of contrasts of the captured images; and a control device that controls operations of the image capture device and the XYZ drive device, wherein the control device controls the image capture device to obtain a partial captured image in which a portion of the substrate is captured by the image capture device, and executes control to display the captured image in the image display region of the display device and to display a plurality of divided regions in the image display region of the display device; the control device controls the in-focus determination device to perform in-focus image determination for one divided region that is selected by a user through the input device; and the control device executes control to display the captured image, which has been determined as the in-focus image, in the image display region of the display device.

The above working device according to the present invention may further comprise a discharge device including a nozzle, and an attachment member that couples the discharge device and the XYZ drive device.

In the above working device according to the present invention, the display device may be a display device including a touch panel, and the input device may be constituted by buttons displayed on the touch panel.

Advantageous Effect of Invention

The present invention makes it possible to realize, with an inexpensive device configuration, automatic focusing on a feature point of an arbitrary object selected from an image in which objects having various shapes and being present within the visual field of the image capture device are captured.

BRIEF DESCRIPTION OF THE DRAWINGS

FIG. 1 is an overall perspective view of a working device according to an embodiment.

FIG. 2 is an illustration referenced to explain an operating screen of the working device according to the embodiment.

FIG. 3 is an illustration referenced to explain a focusing method according to the embodiment. Specifically, FIG. 3(*a*) illustrates an image focused on a wiring line, FIG. 3(*b*) illustrates an image focused on a part, and FIG. 3(*c*) illustrates a substrate and an image capture device when viewed from a side.

FIG. 4(*a*) is a plan view illustrating a scan path of the image capture device 3, and FIG. 4(*b*) is a plan view illustrating an entire image of the substrate.

FIG. 5 is an illustration referenced to explain teaching in the working device according to the embodiment. Specifically, FIG. 5(a) illustrates a captured image A at a first position, FIG. 5(b) is an illustration referenced to explain a position instruction on an entire image, and FIG. 5(c) illustrates a captured image B at a second position.

FIG. 6 is an illustration referenced to explain multi-focus determination in the embodiment.

FIG. 7 is an illustration referenced to explain an operating screen for the multi-focus determination in the embodiment.

DESCRIPTION OF EMBODIMENTS

An embodiment for carrying out the present invention will be described below.

<Device>

FIG. 1 illustrates a working device 1 that practices a focus adjustment method according to the present invention.

The working device 1 according to the embodiment is constituted mainly by an image capture device 3, an X drive device 4, a Y drive device 5, a Z drive device 6, and a computer 11 functioning as a control device 10 that controls operations of the drive devices (4, 5 and 6).

The image capture device 3 captures an image of a substrate 17 placed on a work table 2. For example, a CCD camera having about 240000 pixels (i.e., 512×480 pixels) is used as the image capture device 3. A single focus lens having a relatively small number of lenses is preferably used from the viewpoint of weight and cost. In the present invention, a zoom lens is not needed because the image capture device 3 can be moved up and down by the Z drive device 6. On the other hand, a high-power lens having a relatively high magnification and a relatively shallow depth of field needs to be used in order to measure the position and the size of a work with high accuracy. It is disclosed here to use, as such a lens, a lens having magnification of 2 to 8 and the depth of field ranging from 0.05 to 0.5 mm, for example.

Instead of the CCD camera, another type of camera may also be used as the image capture device 3 insofar as it enables a captured image to be processed by software. The image capture device 3 may additionally include a magnifying lens or an illumination lamp as required.

A object (work) of which image is to be captured by the image capture device 3 is, for example, a substrate on which a semiconductor element is mounted. A wiring pattern is formed on a surface of the substrate. When the object is a rectangular semiconductor chip and focus adjustment is performed in a substrate coating step for underfilling or encapsulation, for example, a corner of the semiconductor chip can be set as a coating start reference position (i.e., an alignment mark). It is to be noted that a feature point of an object, which can be set as the alignment mark, is not limited to a corner of a rectangular object.

The image capture device 3 is mounted to the Z drive device 6 through an attachment member 20, and it is movable in an up and down direction (denoted by numeral 9). The Z drive device 6 is mounted on the X drive device 4, and it is movable in a right and left direction (denoted by numeral 7). A discharge device 18 for discharging a liquid material and an inspection device 19 for inspecting a state of the substrate 17 are mounted to the attachment member 20 in the form of a plate such that both the devices 18 and 19 are movable together with the image capture device 3 in three directions (denoted by numerals 7, 8 and 9) relative to the work table 2 by the drive devices (4, 5 and 6).

The work table 2 on which the substrate 17 is placed is mounted to the Y drive device 5, and it is movable in a forth and back direction (denoted by numeral 8).

For example, a combination of a ball screw and an electric motor, or a linear motor can be used as each of the drive devices (4, 5 and 6), and each drive device is able to achieve continuous positioning at a minute distance interval (with accuracy of, e.g., 0.1 mm or less).

The computer 11 includes an in-focus determination device 12 for executing processing of an image captured by the image capture device 3, and performing in-focus determination, a display device 13 for displaying an image captured by the image capture device 3, an input device 14 through which setting values are input and various input operations are performed, and a storage device 15 for storing images, numerical values, etc. The computer 11 can be constituted by a universal personal computer (PC). The computer 11 is connected to the working device 1 through a connecting cable 16. The display device 13 of the computer 11 in this embodiment is, e.g., a touch panel type, and it also functions as the input device 14. In other words, since the display device 13 includes input means, input operations can be made in this embodiment without using an input device, such as a keyboard or a mouse. Alternatively, the display device 13 may be constituted by, e.g., a liquid crystal display having only a display function, and the input device 14 may be constituted by a physical input device, such as a keyboard or a mouse.

<Operating Screen>

In the working device 1 according to this embodiment, operations are instructed on a screen of the display device 13 of touch panel type. FIG. 2 is an explanatory view of an operating screen 21.

The operating screen 21 includes an image display region 22 in which an image captured by the image capture device 3 is displayed, a select button 23 for selecting a later-described image display region that becomes a target of focusing, a store button 24 for instructing an operation to store an image and coordinate values, and a multi-focus determination button 25 described later, a camera image display button 26 for instructing display of an image that is actually captured by the image capture device 3 at a current position thereof, and an entire image display button 27 for instructing display of an entire image 38 of the substrate 17, the entire image 38 being captured in advance.

The image display region 22 has divided regions resulting from dividing the entire region into, e.g., 2 to 16 equal regions depending on condition of irregularities of the object (work). The divided regions are displayed in a way surrounded by frame lines such that a user can visually recognize the divided regions. When a rectangular object is arranged as the object (work), an alignment mark is set at a corner of the object in many cases. In those cases, the image display region 22 is preferably divided into four regions such that the object occupies all of the divided regions. In this embodiment, the image display region 22 is divided into four equal regions A to D. Thus, the number of pixels in each of the regions A to D is 256×240.

The select button 23 in this embodiment is demarcated into five regions (a to e), and positions of the four buttons (a to d) at corners correspond respectively to positions of the divided regions (A to D) resulting from dividing the image display region 22 into the four equal regions in the vertical and horizontal directions. The center button e is used to perform focusing over all the divided regions (A+B+C+D) of the image display region 22.

<Focus Adjustment Operation>

Automatic focus adjustment operation will be described below with reference to FIGS. 3 and 4.

FIG. 3 illustrates the case where a wiring line 28 and a part A 29 are mounted on an upper surface of the substrate 17. FIGS. 3(a) and 3(b) represent images of a portion of the substrate 17, the images being captured from above. In those images, the wiring line 28 is captured in a state extending vertically over the divided regions B and D, while the part A 29 is captured in the entirety of the divided region C. In FIG. 3(a), the wiring line 28 is focused, and in FIG. 3(b), the part A 29 is focused. FIG. 3(c) is a side view representing a positional relation between the substrate 17 and the image capture device 3.

FIG. 4(a) is a plan view illustrating a scan path 37 of the image capture device 3, and FIG. 4(b) is a plan view illustrating the entire image 38 of the substrate 17. The entire image of the substrate 17 is obtained by capturing the image while a lens 35 of the image capture device 3 is moved along the scan path 37 by the X drive device 4 and the Y drive device 5. An image (partial captured image) captured once by the image capture device 3 is as per denoted by numeral 36. Only a portion of the substrate is displayed in a visual view for the image capturing. Thus, the entire image of the substrate 17 is obtained in FIG. 4 by capturing images 24 times. The entire image 38 of the substrate 17, illustrated in FIG. 4(b), is formed by joining 24 captured images together.

The automatic focus adjustment operation is performed in such a state that the image 36, which is captured once by the image capture device 3, is divided into the four image display regions A to D.

In the following, operation procedures are described in connection with the case of performing focusing on the wiring line 28, which extends vertically over the divided regions B and D.

First, the wiring line 28 extending vertically over the divided regions B and D is displayed on the operating screen 21. In this stage, the wiring line 28 is usually in an unfocused state. The select button 23b or 23d corresponding to the divided region B or D, in which the wiring line 28 is captured, is pushed in that state. Upon the select button being pushed, the image capture device 3 is moved downward by the Z drive device 6 (without being moved horizontally). Here, the downward movement of the Z drive device 6 is preferably started after raising the image capture device 3 through several millimeters (e.g., about 2 mm). The reason is as follows. The determination on whether the wiring line 28 is in the in-focus state is made by comparing a plurality of captured images. If the wiring line 28 is in the in-focus state just at an operation start position, there is a possibility that the determination regarding the in-focus state is not performed and the in-focus position is passed because no comparison target image is present.

While moving downward, the image capture device 3 continuously captures images of the upper surface of the substrate 17 in a portion corresponding to the selected divided region, and the captured images are sequentially stored in the storage device 15 together with respective Z-coordinate values of positions where the images have been captured. For example, the image capture device 3 is moved downward through 60 mm at a speed of 2 mm/sec, and it captures the images at intervals of 0.02 mm. Thus, in this embodiment, 3000 images are obtained at maximum.

The in-focus determination device 12 can be realized with software that instructs an arithmetic unit of the computer 11 to execute an in-focus determination process. More specifically, the arithmetic unit of the computer 11 executes image processing on the plural captured images stored in the storage device 15, determines one of the images having a peak in contrast as an in-focus image, and assigns an in-focus identification flag to the in-focus image. A time taken to execute the in-focus determination process is about 2 to 3 sec, for example.

In the image processing executed by the arithmetic unit of the computer 11, a difference in color value between adjacent pixels in each captured image is calculated for all pixels, and calculated values are stored in the storage device 15. The captured image including the pixels, which exhibit a maximum difference in color value, is determined as the in-focus image. While, in this embodiment, the color value is expressed in 256 tones, the number of tones is not limited to 256, and the color value may be expressed in, e.g., 4096 tones or 65536 tones. The image processing is executed in parallel to the downward movement of the image capture device 3, and the downward movement of the image capture device 3 is stopped when the in-focus image is determined. The difference in color value has a tendency to gradually increase with the downward movement, and to gradually decrease after passing a peak. In this embodiment, therefore, a Z-direction position at which the peak appears is determined as the in-focus position. Although the peak number is not always limited to one, this embodiment is designed such that the downward movement is stopped at a time when the first peak is detected. An image of the object as a focusing target is clearly displayed in the image display region 22 of the operating screen 21. In FIG. 3(a), for example, the wiring line 28 is focused. The object as the focusing target may be a recess formed in the substrate.

A lower limit value is set by the user for the operation of moving the image capture device 3 downward in the Z-axis direction. With such a specification, the downward moving operation is automatically stopped at the lower limit value even in the case where the in-focus image is not determined. The lower limit value needs to be set to a value at which the image capture device 3 and the discharge device 18 are prevented from striking against the upper surface of the substrate 17 or the mounted part. When the in-focus image is not found even with the image capture device 3 being moved downward to the lower limit value, the above-described image processing is further executed while the image capture device 3 is moved upward from the lower limit position, thereby searching for the image having a peak in contrast (i.e., the in-focus image). An operation of moving the image capture device 3 upward is preferably performed until the image capture device 3 is returned to the origin position of a Z-axis.

The operation procedures in the case of focusing on the wiring line 28 is as per described above. When focusing is to be performed on the part A 29 positioned in a lower left region of the substrate 17 (i.e., positioned in the divided region C), the above-described focus adjustment operation is started by pushing the select button (23c) in the operating screen 21. As a result, the focus adjustment for the other selected image display region can be automatically performed, and a captured image focused on the part A 29 can be obtained as illustrated in FIG. 3(b).

Thus, with the focus adjustment according to this embodiment, focusing can be automatically performed on an object on the substrate, the object being present within the selected divided region of the image display region. Furthermore, since the lower limit value is set for the operation of moving the image capture device downward in the Z-axis direction, there is no risk that the image capture device 3 may strike against the object on the substrate.

This embodiment is premised on that, in the substrate mounting a plurality of objects (such as parts and wiring lines) thereon, one type of object is mounted in one divided region. When plural types of objects are mounted in one divided region, a desired focus position can be selected with a multi-focus determination function described later.

<Teaching>

One example of teaching of a reference position for alignment will be described below with reference to FIG. 5. The following procedures can also be applied to the case of setting, a coating position or an inspection position.

The teaching is generally performed in a manner of storing two reference positions in the computer. From the viewpoint of accuracy, two points located at two positions, which are present on the substrate and are spaced from each other through a certain distance, are preferably set as the reference positions. For example, the two reference positions are set to a point near an upper right corner and a point near a lower right corner of the substrate (both the points being in a vertically spaced relation), to a point near the upper right corner and a point near an upper left corner of the substrate (both the points being in a horizontally spaced relation), and to a point near the upper right corner and a point near a lower left corner of the substrate (both the points being in a diagonally spaced relation).

The procedures in the case of, after finishing the teaching for a captured image 36A at a first position, performing the teaching for a captured image 36B at a second position will be described below.

FIG. 5(a) illustrates the captured image 36A at the first position, FIG. 5(b) is an illustration referenced to explain a position instruction on the entire image 38, and FIG. 5(c) illustrates the captured image 36B at the second position.

(1) Upon the "entire image display button 27" being pushed in a state where the captured image 36A is displayed in the image display region 22, the entire image 38 of the substrate 17 is displayed in the image display region 22.

(2) A position to be registered as the reference position is instructed on the screen. The user touches the desired position, i.e., the second position 40 in the example of FIG. 5, with a finger. Responsively, the image capture device 3 is moved to the instructed second position 40 by the X drive device 4 and the Y drive device 5.

(3) The "camera image display button 26" is pushed to instruct the image capture device 3 to change over the displayed image to the captured image 36B. At this point in time, the image capture device 3 is not focused on the captured image 36B.

(4) The "select button 23" (one of the select buttons 23a to 23e) corresponding to the divided region, which includes the position to be focused, is pushed. Responsively, the above-described focus adjustment operation is started, and the focus adjustment of the image capture device 3 is automatically performed.

(5) A position of the image displayed in the image display region 22 is adjusted such that a feature point (e.g., a corner of the part) serving as the reference position is located at a center of the screen. In this embodiment, upon the user touching the feature point displayed in the image display region 22 with the finger, the position of the image is automatically adjusted such that the touched position is located at the center of the screen. The "store button 24" is then pushed to store XYZ coordinate values (and the captured image 36B displayed at that time).

The teaching of the reference position for alignment is completed through the above-described operations.

<Multi-Focus Determination Function>

A focus determination method in the case where plural types of objects are mounted within one divided region will be described below with reference to FIGS. 6 and 7.

Assume here that, as illustrated in FIG. 6, parts (29 and 30) having different heights and the wiring line 28 are present in one divided region. When the one divided region is selected and the multi-focus determination button 25 in the image display region 22 is pushed on the operating screen 21, a multi-focus determination screen 31 is displayed as illustrated in FIG. 7. When a start button 32 is pushed on the multi-focus determination screen 31, the Z drive device 6 is operated to raise a Z position of the image capture device 3 through a distance (about 40 mm in an example of FIG. 6) in consideration of the heights of the objects (28, 29 and 30), which are mounted on the surface of the substrate 17, and then to move the image capture device 3 downward. In the case where position adjustment of the image capture device 3 in the horizontal direction is not completed, the image capture device 3 is horizontally moved by the X drive device 4 and the Y drive device 5 in parallel to the operation of moving the image capture device 3 in the Z-direction (vertical direction), or at timing before or after that operation.

While moving downward, the image capture device 3 continuously captures images of the upper surface of the substrate 17 in a portion corresponding to selected one of the divided regions A to D. The captured images are sequentially stored in the storage device 15 together with respective Z-coordinate values of positions where the images have been captured. Such a process of continuously capturing the images is similar to that in the above-described focus adjustment operation. In the case of the multi-focus determination, however, the downward movement of the image capture device 3 is not stopped midway, and the continuous image capturing is performed until the image capture device 3 reaches the lower limit value that has been set by the user in advance.

The arithmetic unit of the computer 11 executes the image processing of the plural captured images stored in the storage device 15, determines an in-focus image, and assigns an in-focus identification flag to the in-focus image. The in-focus image is determined, for example, on the basis of a preset determination reference value (e.g., ½, ⅓ or ¾ of a maximum color value, or a threshold for differential values of individual captured images). The captured images satisfying the condition set for the in-focus determination are selected and, after assigning part numbers to the selected images in an ascending order (or a descending order) of their Z-coordinate values, the selected images are displayed in an image display region 34 in an arrayed state (see FIG. 7). The Z-coordinate value at a time of capturing the image of each in-focus object is converted to a height of the in-focus image from the substrate, and is displayed in a height display region 33 that is positioned at a side of the image display region 34. A relation formula between the Z-coordinate value and the height of the in-focus object is obtained by performing the focusing operation on an object for which height information is known in advance. In the example of FIG. 6, three in-focus images are obtained for the wiring line 28, a part A 29, and a part B 30, and part numbers from No. 1 to No. 3 are assigned to those in-focus images, respectively. Thus, the in-focus captured images are displayed together with respective values (mm) of the part heights in a way linked to the part numbers.

While the embodiment of the present invention has been described in detail above for the purpose of merely illustrative representation, the embodiment can be various modified without substantially departing from the scopes of the novel concept and the advantageous effects of the present invention.

LIST OF REFERENCE SIGNS

1: working device, 2: work table, 3: image capture device, 4: X drive device, 5: Y drive device, 6: Z drive device, 7: X moving direction, 8: Y moving direction, 9: Z moving direction, 10: control device, 11: computer, 12: image processing device, 13: display device (output device), 14: input device, 15: storage device, 16: connection cable, 17: work (substrate), 18: discharge device, 19: inspection device, 20: attachment member, 21: operating screen, 22: image display region, 23: select button (a to e), 24: store button, 25: multi-focus determination button, 26: camera image display button, 27: entire image display button, 28: wiring line, 29: part A, 30: part B, 31: multi-focus determination screen, 32: start button, 33: height display region, 34: image display region, 35: lens, 36: image captured once (partial captured image), 37: scan path, 38: entire image of substrate, 39: first position, 40: second position

The invention claimed is:

1. A focus adjustment method using a working device that includes:
    a work table on which a substrate is placed;
    an image capture device not having an autofocus function;
    an XYZ drive device that moves the work table and the image capture device relative to each other;
    a storage device that stores images captured by the image capture device;
    a display device including an image display region that has a plurality of divided regions;
    an input device allowing arbitrary one of the divided regions in the image display region to be specified;
    an in-focus determination device that executes image processing on the plurality of captured images having been stored in the storage device, and that determines an in-focus image on the basis of contrasts of the captured images; and
    a control device that controls operations of the image capture device and the XYZ drive device,
    wherein the substrate is a substrate on which a plurality of objects having different heights are arranged on a surface of the substrate, and
    wherein the focus adjustment method comprises:
    a first step of obtaining a partial captured image in which a portion of the substrate is captured by the image capture device, and displaying the partial captured image in the image display region of the display device, wherein an image of a portion of the substrate is captured such that the captured image includes at least two of the objects;
    a second step of obtaining the plurality of captured images for a portion of the substrate corresponding to one divided region of the image display region, the one divided region being selected by a user through the input device, while the image capture device is moved in an up and down direction relative to the substrate, storing the plurality of captured images in the storage device, and causing the in-focus determination device to perform in-focus image determination on the captured images having been stored, wherein the captured images are continuously obtained while the image capture device is moved in the up and down direction relative to the substrate, the captured images are stored in the storage device together with coordinate values in the up and down direction at times when the images are captured, wherein those of the captured images in the one divided region selected by the user, which satisfy a determination reference value, are determined as in-focus images, and an in-focus identification flag is assigned to each of the captured images having been determined as the in-focus images; and
    a third step of displaying all of the captured images, which have been determined as the in-focus images and each assigned with the in-focus identification flag, in an arrayed state in the image display region.

2. The focus adjustment method according to claim 1, wherein at least one of the objects is rectangular, and the image display region is divided into four equal divided regions.

3. The focus adjustment method according to claim 1, wherein height information of an in-focus object in each of the in-focus images is displayed together in the third step.

4. A working device comprising:
    a work table on which a substrate is placed;
    an image capture device not having an autofocus function;
    an XYZ drive device that moves the work table and the image capture device relative to each other;
    a storage device that stores images captured by the image capture device;
    a display device including an image display region that has a plurality of divided regions;
    an input device allowing arbitrary one of the divided regions in the image display region to be specified;
    an in-focus determination device that executes image processing on the plurality of captured images having been stored in the storage device, and that determines an in-focus image on the basis of contrasts of the captured images; and
    a control device that controls operations of the image capture device and the XYZ drive device,
    wherein the substrate is a substrate on which a plurality of objects having different heights are arranged on a surface of the substrate, and
    wherein the control device controls the image capture device to obtain a partial captured image in which a portion of the substrate is captured by the image capture device, and executes control to display the partial captured image in the image display region of the display device and to display the plurality of divided regions in the image display region of the display device, wherein an image of a portion of the substrate is captured such that the captured image includes at least two of the objects;
    the control device executes control to obtain the plurality of captured images for a portion of the substrate corresponding to one divided region of the image display region, the one divided region being selected by a user through the input device, while the image capture device is moved in an up and down direction relative to the substrate, to store the plurality of captured images in the storage device, and to cause the in-focus determination device to perform in-focus image determination on the captured images having been stored, wherein the captured images are continuously obtained while the image capture device is moved in the up and down direction relative to the substrate, the captured images are stored in the storage device together with coordinate values in the up and down direction at times when the images are captured, wherein those of the captured images in the one divided region selected by the user, which satisfy a determination reference value, are determined as in-focus images, and an in-focus identification flag is assigned to each of the captured images having been determined as the in-focus images; and the control device executes control to display all of the captured images, which have been determined as the in-focus image each assigned with the in-focus identification flag, in an arrayed state in the image display region of the display device.

5. The working device according to claim 4, further comprising a discharge device including a nozzle, and an attachment member that couples the discharge device and the XYZ drive device.

6. The working device according to claim 4, wherein the display device is a display device including a touch panel, and the input device is constituted by buttons displayed on the touch panel.

7. The working device according to claim 5 wherein the display device is a display device including a touch panel, and the input device is constituted by buttons displayed on the touch panel.

8. The working device according to claim 4, wherein height information of an in-focus object in each of the in-focus images is displayed together in addition.

9. The focus adjustment method according to claim 1 wherein in the second step, the image capture device is moved in the up direction through a distance in consideration of the heights of the objects, and then moved in the down direction to obtain the plurality of the captured images.

10. The working device according to claim 4, wherein the image capture device is moved in the up direction through a distance in consideration of the heights of the objects, and then moved in the down direction to obtain the plurality of the captured images.

* * * * *